US008894019B2

(12) United States Patent
Alvi

(10) Patent No.: US 8,894,019 B2
(45) Date of Patent: Nov. 25, 2014

(54) METHOD OF USING MICROJET ACTUATORS FOR THE CONTROL OF FLOW SEPARATION AND DISTORTION

(71) Applicant: Farrukh S. Alvi, Tallahassee, FL (US)

(72) Inventor: Farrukh S. Alvi, Tallahassee, FL (US)

(73) Assignee: Florida State University Office of Commercialization, Tallahasse, FL (US)

( * ) Notice: Subject to any disclaimer, the term of this patent is extended or adjusted under 35 U.S.C. 154(b) by 223 days.

(21) Appl. No.: 13/731,195

(22) Filed: Dec. 31, 2012

(65) Prior Publication Data

US 2014/0182695 A1 Jul. 3, 2014

(51) Int. Cl.
*B64C 21/04* (2006.01)
*F15D 1/00* (2006.01)
*B64D 33/02* (2006.01)

(52) U.S. Cl.
CPC ............... *F15D 1/008* (2013.01); *B64C 21/04* (2013.01); *B64D 33/02* (2013.01); *B64D 2033/0226* (2013.01)
USPC .......................... 244/207; 244/200.1; 244/204

(58) Field of Classification Search
CPC ........ B64C 21/04; B64C 21/08; B64C 23/06; Y02T 50/16; Y02T 50/166; Y02T 50/168
USPC ....................... 244/207, 204, 200.1, 201, 198
See application file for complete search history.

(56) References Cited

U.S. PATENT DOCUMENTS

| | | | | |
|---|---|---|---|---|
| 7,213,788 | B1 * | 5/2007 | Alvi et al. | 244/207 |
| 7,874,525 | B2 * | 1/2011 | Miller et al. | 244/207 |
| 8,303,024 | B2 * | 11/2012 | Alvi | 296/180.1 |
| 8,359,825 | B2 * | 1/2013 | Alvi | 60/204 |
| 2006/0202082 | A1 * | 9/2006 | Alvi | 244/12.1 |
| 2009/0261206 | A1 * | 10/2009 | Alvi | 244/207 |
| 2009/0288711 | A1 * | 11/2009 | Alvi | 137/1 |
| 2009/0308980 | A1 * | 12/2009 | Miller et al. | 244/207 |
| 2011/0203673 | A1 * | 8/2011 | Alvi | 137/13 |

* cited by examiner

*Primary Examiner* — Philip J Bonzell
(74) *Attorney, Agent, or Firm* — J. Wiley Horton

(57) ABSTRACT

A system for controlling unwanted flow separation. One or more microjets are placed to feed auxiliary fluid into a region of suspected flow separation on a surface. If the separation is intermittent, sensors can be employed to detect its onset. Once separation is developing, the microjets are activated to inject a stream of high-velocity gas in a direction that is transverse to the prevailing flow. This injected stream forms counter-rotating vortices in the prevailing flow and thereby transfers momentum from the prevailing flow into the boundary layer proximate the surface.

15 Claims, 21 Drawing Sheets

METHOD OF USING MICROJET ACTUATORS FOR THE CONTROL OF FLOW SEPARATION AND DISTORTION

STATEMENT REGARDING FEDERALLY SPONSORED RESEARCH OR DEVELOPMENT

This invention involves federally sponsored research. The sponsoring agency is the National Aeronautics and Space Administration.

CROSS-REFERENCES TO RELATED APPLICATIONS

This application is a continuation-in-part of U.S. application Ser. No. 12/378,605, which was filed on Feb. 18, 2009. Application Ser. No. 12/378,605 was itself a continuation of application Ser. No. 11/329,721, which was filed on Jan. 11, 2006 (Note that Ser. No. 11/329,721 claimed the benefit of an earlier-filed provisional application having Ser. No. 60/646,951).

MICROFICHE APPENDIX

Not Applicable

BACKGROUND OF THE INVENTION

1. Field of the Invention

This invention relates to the field of flow control in a fluid. More specifically, the invention comprises the use of properly placed microjets to control flow separation and or recirculation over a given surface.

2. Description of the Related Art

Flow separation is defined as the detachment of a flowing fluid from a solid surface. It is generally caused by a severe pressure gradient. The gradient itself may result from a geometric feature on the solid surface, or simply placing the surface at a high angle of attack with respect to the airstream. Whatever the cause, flow separation produces a significant thickening of the turbulent region adjacent to the solid surface. The boundary layer may even detach from the surface to produce a region of reverse flow. Such reverse flow can be intermittent or continuous.

Flow separation is undesirable in many applications. One example is the complex inlet ducting used to feed air to an aircraft engine. Such inlets are now commonly curved, so that the high radar signature of the compressor will not be directly visible. FIG. 1 illustrates a serpentine inlet 10, which is one example of many types. The intake is toward the left side of the view with the engine compressor being located proximate the exhaust portion in the right side of the view. The reader will observe that the air flow bends through a circuitous path and transitions from a four-sided intake section to the round section needed at the compressor intake.

Such an inlet is designed to handle large amounts of air flow. Flow separation is a known problem in such applications. Those skilled in the art will know that the serpentine may experience variable flow. As the aircraft maneuvers—often undergoing substantial angles of attack in pitch and yaw—the pressure distribution across the intake varies significantly. This variance produces flow separation in different locations at different times. A substantial flow separation can degrade the engine performance and even lead to compressor stall.

The prior art includes several approaches to reducing and controlling flow separation. These include: (1) Injecting pressurized air in a direction which is tangential to the flow—such as slotted aircraft flaps; (2) Applying vacuum to the boundary layer by using vacuum orifices or a permeable surface; (3) Adding vortex generators, such as vanes or bumps; and (4) Adding forced excitation devices such as synthetic jets (which include no net mass flux, but create an effect similar to devices which add or subtract mass to the flow). The prior art approaches clearly indicate the desirability of controlling flow separation.

FIG. 3B provides an illustration of the prior art approach of injecting pressurized air in a direction which is tangential to the flow. Boundary layer separation occurs when flow momentum is lost and the air in the vicinity of the boundary layer stops moving and/or actually reverses direction. In the prior art, flow separation is sometimes reduced or eliminated using direct momentum injection. In FIG. 3B, direct momentum injector 80 injects a relatively high mass in the vicinity of high adverse pressure gradient 18. Added mass 82 possesses momentum "artificially" created by the injection process itself. Incoming boundary layer 42 is able to flow over the added mass and the prevailing flow thereby remains attached.

An example of this approach is disclosed in U.S. Pat. No. 5,447,283. The Tindall invention deals with an inlet for a jet aircraft engine. The aircraft in question is designed to operate in the subsonic, transonic, and supersonic regimes. Several different direct momentum injector nozzles are located at different points in the inlet. Each is fed by pressurized air taken from the jet engine's compressor ("bleed air").

The amount of air injected in the Tindal device ranges between 1% and 3% of the total flow through the inlet. This is a relatively high flow rate. Ann exemplary military jet engine is the PRATT & WHITNEY F100 used in the F-15 and F-16 aircraft. A typical inlet flow rate for this engine is about 300 kg/second without the afterburner being lit. Using this exemplary flow rate, one may determine that the mass injected by the Tindall device varies between 3 kg/second and 9 kg/second. This is a very substantial mass injection rate.

As is known to those skilled in the art, the use of bleed air taken from an engine's compressor reduces the engine's performance. It is generally undesirable and the minimization of the amount of bleed air required is a well known goal. The prior art approach of direct momentum injection works in many cases, but it entails a significant performance penalty because of the mass flow rate required. It would therefore be preferable to provide a flow control device that uses a significantly lower mass flow rate. The present invention provides such a solution.

BRIEF SUMMARY OF THE INVENTION

The present invention comprises a system for controlling unwanted flow separation in a fluid flowing over a surface. The fluid can be compressible (such as air) or incompressible (such as water). One or more microjets are placed to feed auxiliary fluid into a region of suspected flow separation. If the separation is intermittent, sensors can be employed to detect its onset. Once separation is developing, the microjets are activated to inject a stream of fluid into the separation region. This injected fluid affects the flow and serves to control the flow separation.

A steady-state embodiment can be used to continuously fluid. On the other hand, sensors and a rapidly reactive control circuit can be used to inject fluid, only when it is needed to inhibit flow separation. The sensors and control circuit can operate off of simple pressure gradient detection or predictive algorithms that anticipate when flow separation will occur.

REFERENCE NUMERALS IN THE DRAWINGS

| 10 | serpentine inlet | 12 | pressure gradient ramp |
| 14 | air flow | 18 | high adverse pressure gradient |
| 20 | velocity vector | 22 | reverse flow |
| 24 | separated flow zone | 26 | microjet |
| 28 | high pressure manifold | 30 | microjet flow |
| 34 | first jet array | 36 | second jet array |
| 38 | third jet array | 40 | airfoil |
| 42 | incoming boundary layer | 44 | boundary layer separation |
| 46 | wing | 48 | aileron |
| 50 | fourth jet array | 52 | fifth jet array |
| 54 | sixth jet array | 56 | microjet cluster |
| 58 | separated flow | 60 | unseparated flow |
| 62 | incoming flow | 64 | air column |
| 68 | flow split | 70 | jet shear layer vortices |
| 72 | horseshoe vortices | 74 | wake vortices |
| 78 | defined area of likely flow separation | | |

-continued

| 80 | direct momentum injector | 82 | added mass |
| 84 | microjet centerline | 86 | streamline |
| 87 | down flow | 88 | right vortex center |
| 89 | up flow | 90 | left vortex center |
| 92 | first intersection point | 94 | second intersection point |
| 96 | center flow | 98 | left flow |
| 100 | right flow | | |

DETAILED DESCRIPTION OF THE INVENTION

Figure 1:
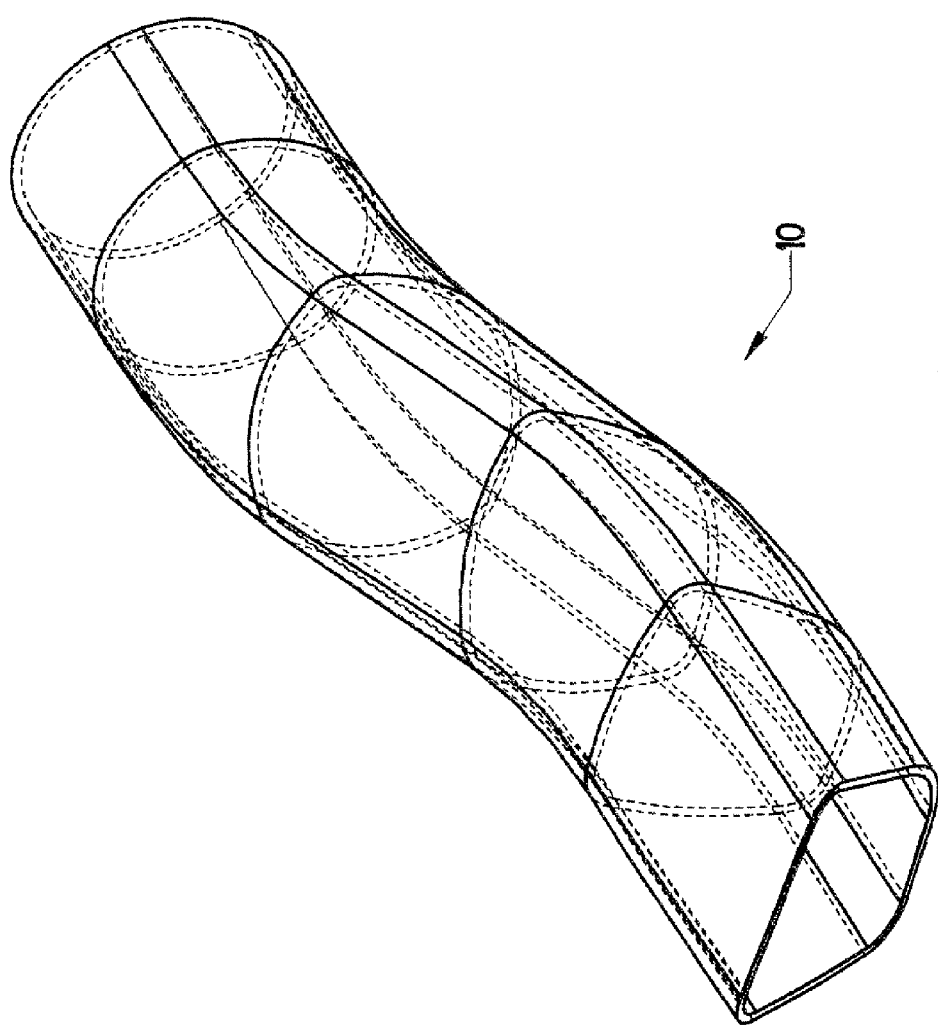
FIG. 1 is a perspective view, showing a serpentine inlet for an aircraft engine.
Figure 2:
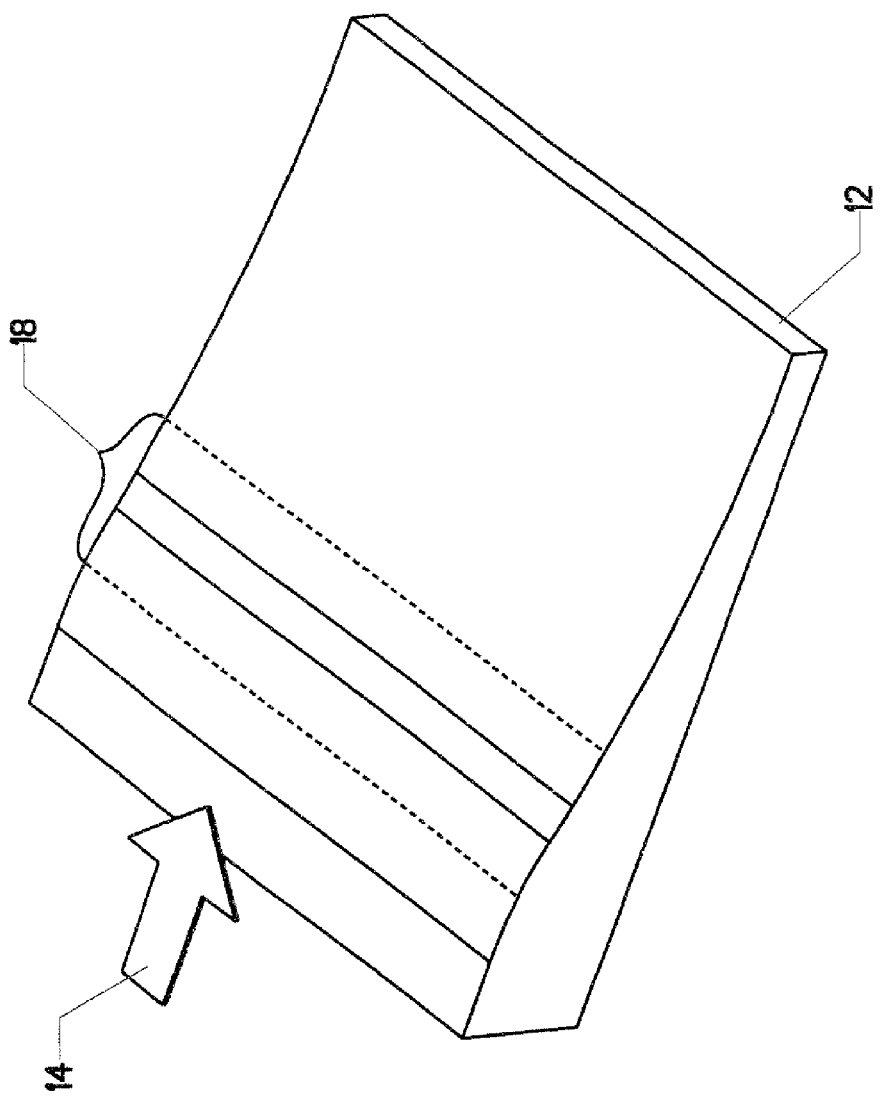
FIG. 2 is a perspective view, showing an adverse pressure gradient ramp.

The present invention can be applied to flow control over many different types of surfaces. As an initial explanation, however, it is useful to describe its application to one particular type of simple surface. FIG. 2 shows an adverse pressure gradient ramp 12. If air flow 14 is directed over the ramp at an appropriate velocity, flow separation will occur in the region of high adverse pressure gradient 18. Air flowing over this geometry produces an adverse pressure gradient. The pressure coefficient is defined by the following expression:

$$C_p = \frac{(P_{surface} - P_\infty)}{0.5\rho \cdot U_\infty^2}$$

In this expression, ρ is the density of the fluid and $U_\infty$ is the undisturbed flow velocity, well away from the ramp.

Figure 3:
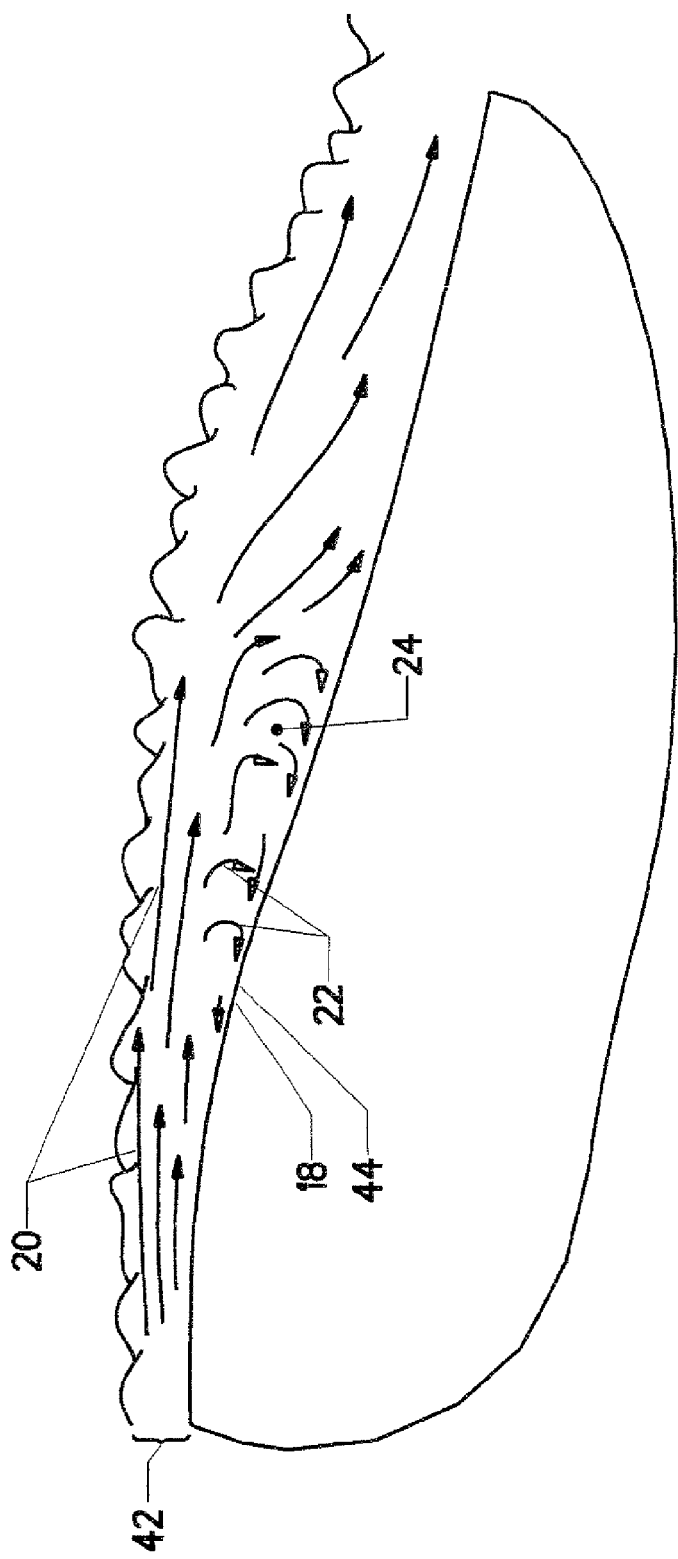
FIG. 3 is a side elevation view; showing flow across a high adverse pressure gradient.
Figure 3B:
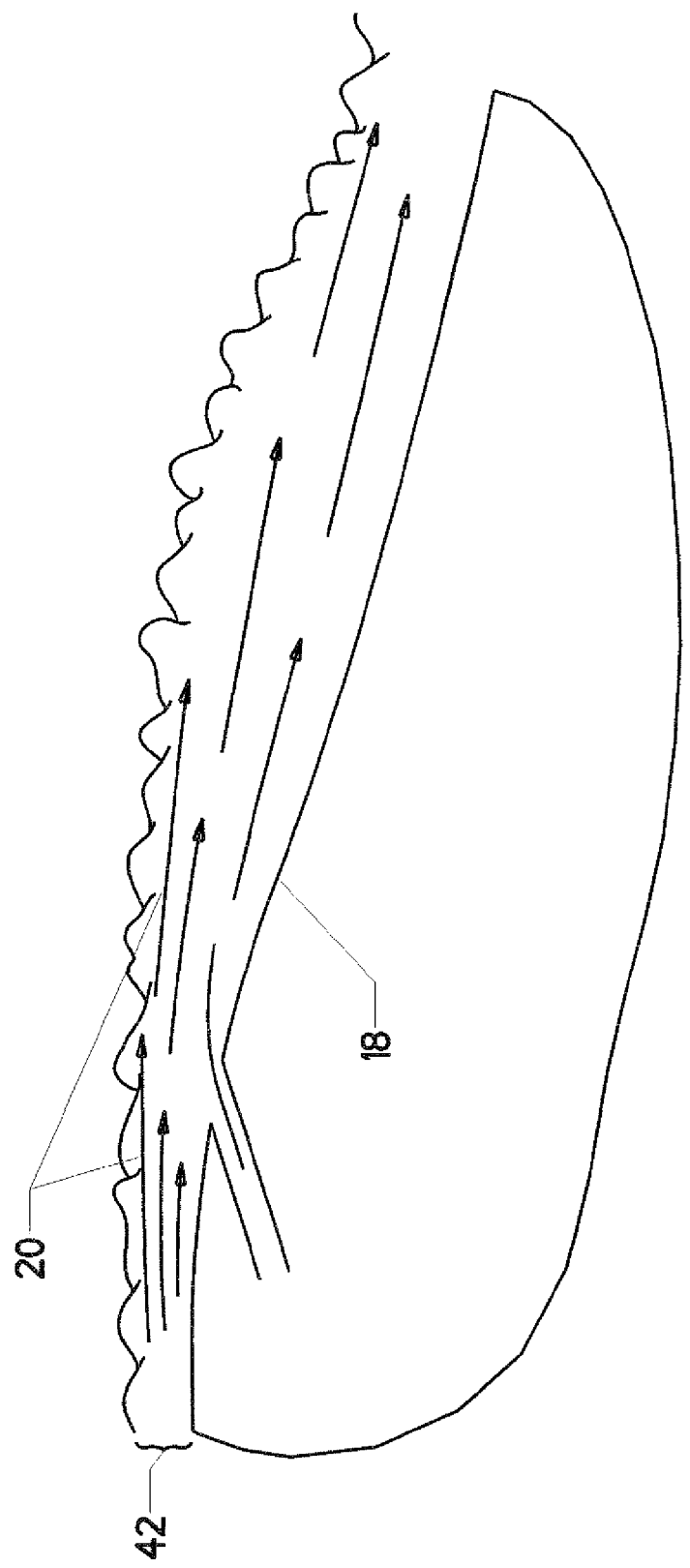
FIG. 3B is a side elevation view, showing the prior art approach of direct momentum injection.

FIG. 3 is a detailed elevation view of the ramp surface in the region of high adverse pressure gradient 18. The approaching flow is represented by velocity vectors 20. Those skilled in the art will be familiar with this type of depiction. The reader will observe that the flow in the vicinity of the highest surface gradient has actually reversed (reverse flow 22). A region of circulating flow has arisen. Because this region is separated from the relatively smooth flow over the bulk of the ramp, it is denoted as a separated flow zone 24.

The existence of the separated flow zone can produce many results. These include: (1) in the case of an air-cooled surface, a localized "hot spot" due to inadequate flow; (2) In the case of an airfoil, premature stall; (3) In the case of an aircraft control surface, loss of control effectiveness.

Figure 4:
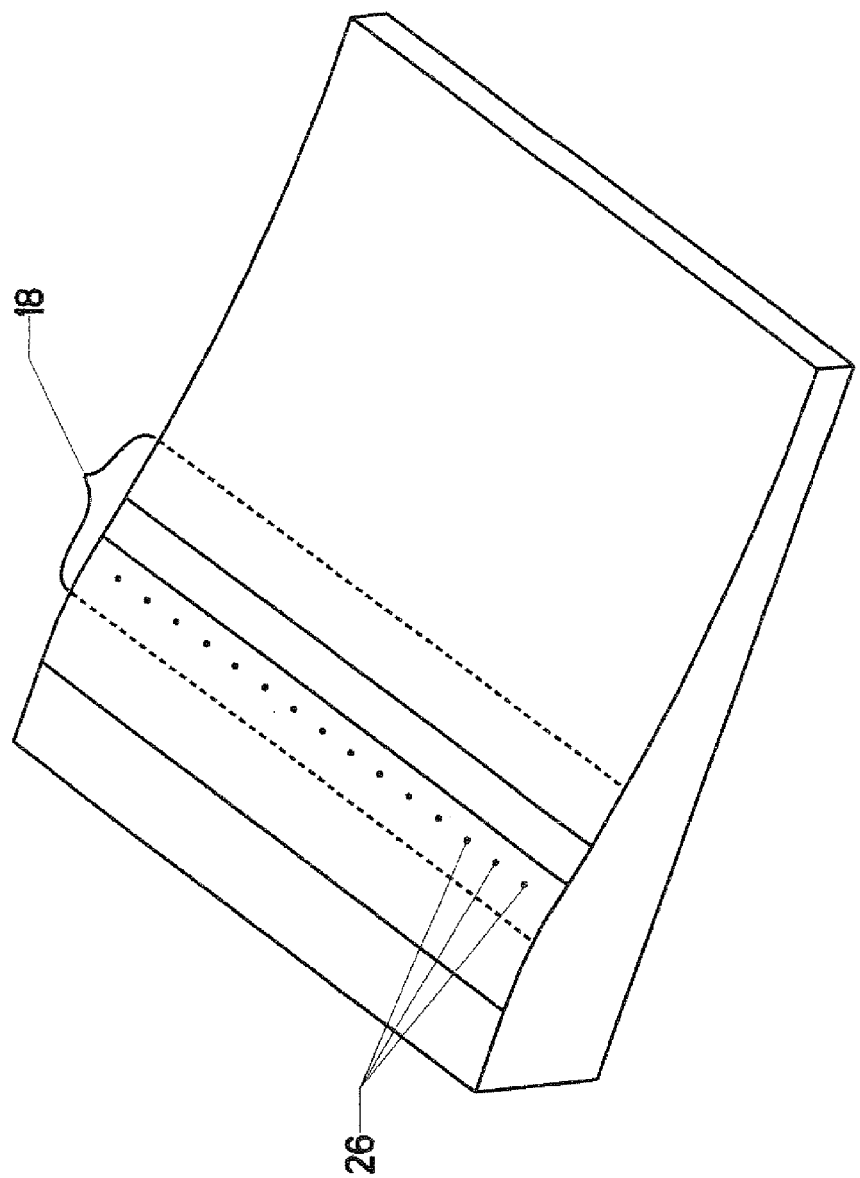
FIG. 4 is a perspective view, showing one embodiment of the present invention.

The present invention seeks to reduce or eliminate this separated flow zone through the use of microjets. FIG. 4 shows a modified version of the pressure gradient ramp. This version incorporates an array of high-speed microjets 26. These are generally oriented transversely to the flow. In other words, they are oriented to inject air upward with respect to the orientation shown in the view.

Figure 5:
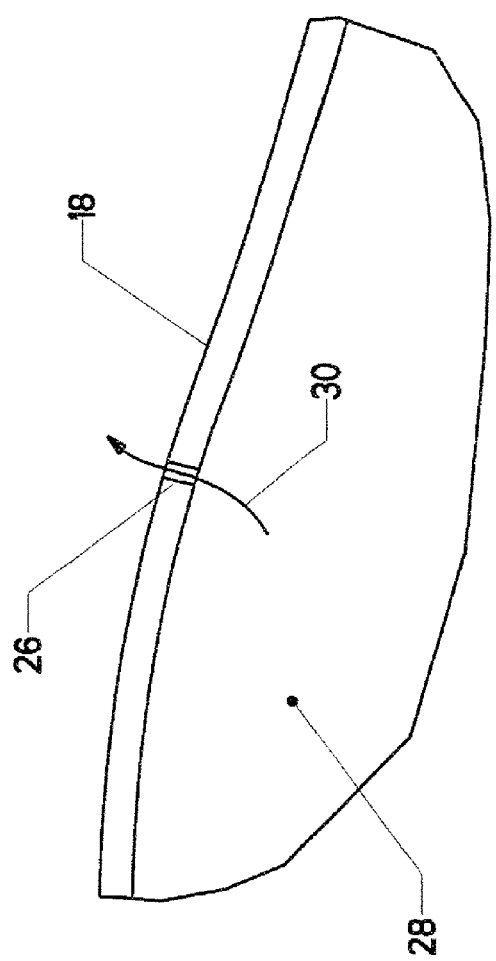
FIG. 5 is a detail view, showing a microjet.

FIG. 5 shows a sectional view through a portion of the ramp's wall. The ramp has a hollow interior, which can be pressurized to create high pressure manifold 28. Microjet 26 connects high pressure manifold 28 to the surrounding flow. Thus, when the manifold is pressurized, microjet flow 30 is propelled into the slipstream. Those skilled in the art will know that many techniques could be used to feed pressurized flow to the microjets, with the ones illustrated merely being representative. Many embodiments would include a flow control device near the microjet itself. This device would be capable of rapidly turning the jet on and off, and possibly throttling the flow.

Figure 6:
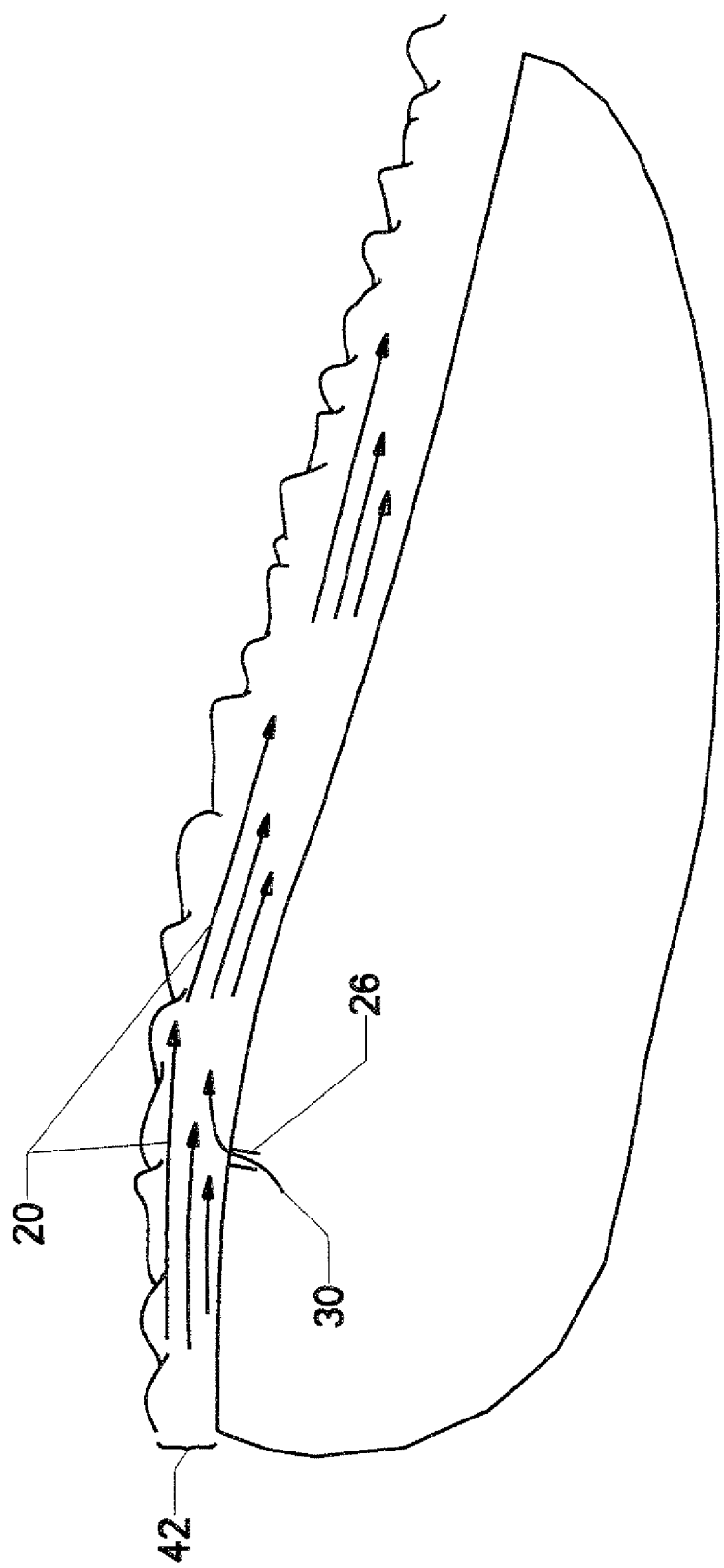
FIG. 6 is a side elevation view, showing flow when the microjets are in use.

If the microjet is properly placed, and an appropriate differential pressure across the microjet is provided, it can eliminate or significantly reduce the separated flow zone. FIG. 6 graphically depicts this function. The reader will observe that the region of reversing flow has been eliminated.

The mechanism by which the transversely-oriented microjet alters the flow over the surface is complex. Prior art jets inject a relatively large mass of air (at relatively low velocity) in a direction approximately parallel to the prevailing flow. This action swells the boundary layer and can in some instances reduce flow detachment by increasing the pressure of the boundary layer and providing additional momentum to replace the momentum lost to the adverse pressure gradient. The use of such a large mass of injected air "plugs the gap" in a separating flow by mechanically inserting more air. The requirement for such a large injected mass in the conventional parallel injection approach means that the parallel injection approach has been impractical for real world applications.

The present inventive method works in a very different way. The present microjets inject a relatively low volume of air at a relatively high velocity, in a direction which is transverse to the prevailing flow. The interaction of the jet with the main flow causes the jet to bend and generate a pair of counter-rotating vortices. In addition, the microjet creates a column of rapidly moving air which the prevailing flow must split and flow around. The effect is in part similar to a flow moving around a transverse stationary object such as a wire. The splitting flow creates counter-rotating vortices. These are shed from the side edges of the jet and flow downstream. The vortices take some time to die, even after they have separated from the air column produced by the microjet. As the vortices move downstream with the prevailing flow, they produce substantially increased mixing. This vortex-enhanced mixing is much more effective than conventional turbulence and the conventional practice of parallel injection. The mass flow required to reattach a flow using perpendicular injection is frequently an order of magnitude less that that required for parallel injection.

A typical microjet will have a diameter ranging from 100 micrometers to 2,000 micrometers (0.0039 inches to 0.0787 inches), and preferably in the range from 200 micrometers up to 1,000 micrometers (0.0079 inches to 0.0394 inches). The differential pressure across the microjet (the input pressure versus the free stream pressure outside the microjet) ranges between 14 kPa and 345 kPa (2 psi and 50 psi). The velocity of the flow emerging from the microjet is quite high, typically in the range of Mach 0.4 to Mach 1.0 (and preferably about 300 meters/second). In many instances the microjet will exhibit choked flow.

The free stream boundary layer velocity into which the microjet is injected may be fairly low—in the range of 10 meters/second to 70 meters/second (This is not necessarily the velocity of the flow at an infinite distance from the surface, but rather the velocity of the flow proximate the boundary layer). The reader will thereby appreciate a substantial difference between the present inventive approach and that employed in the prior art direct momentum injection approach. In direct momentum injection, a large mass of air is injected approximately parallel to the prevailing flow. It will be given a velocity roughly equal to the velocity of the prevailing flow (and often a small amount more). In the present invention, the microjet injects a very small column of air in a direction that is approximately transverse to the prevailing flow. The injection velocity is typically an order of magnitude greater than that of the prevailing flow. The mass flow through the microjet is fairly small, however. In many instances a mass flow of less than 0.2% of the primary flow will be sufficient to produce the desired retention of attached flow.

Figure 6B:
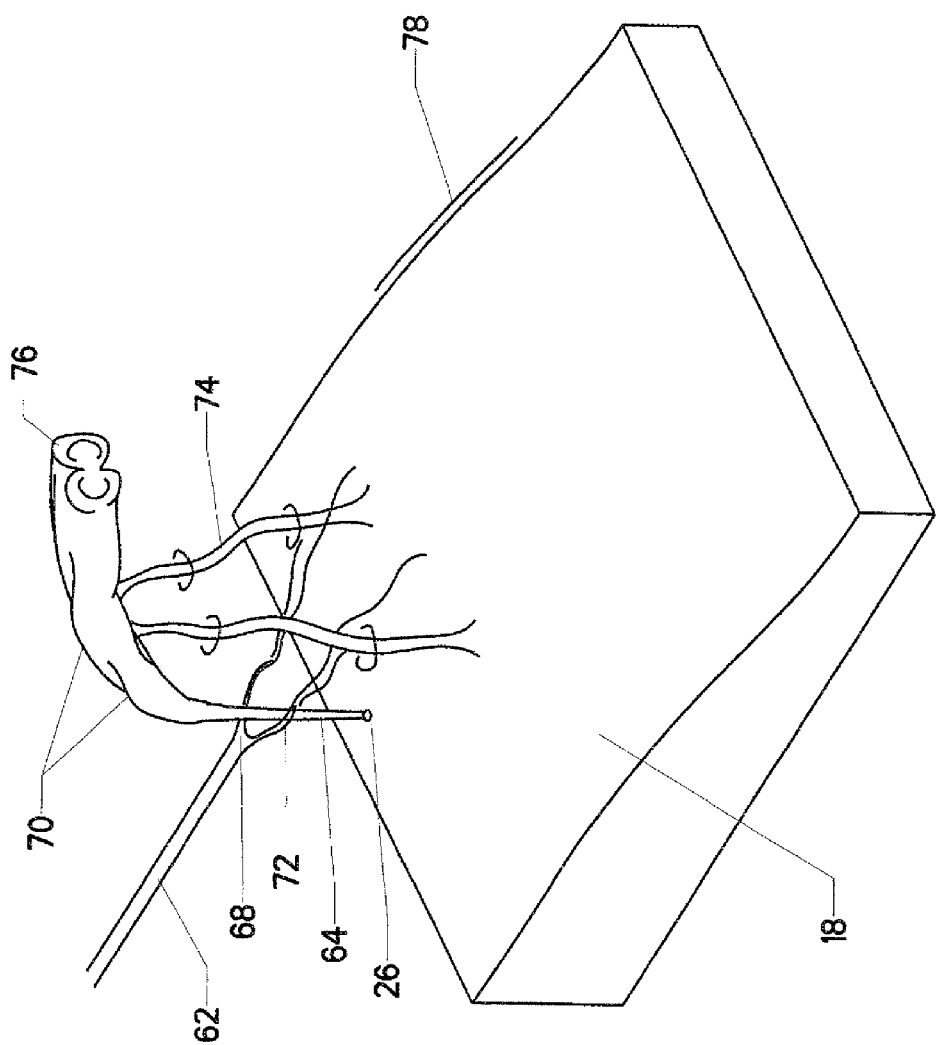
FIG. 6B is a perspective view, showing the flow around a microjet.

FIGS. 6B through 6F illustrate the operation of the microjet and the creation of the complex momentum transfer phenomena. In FIG. 6B, a single microjet 26 is placed upstream of high adverse pressure gradient 18, with the microjet being oriented to inject a high velocity flow in a direction which is approximately transverse to the prevailing flow (The microjet need not be perfectly perpendicular to the prevailing flow. Variations of up to 15 degrees can be employed while still creating the desired effects). Defined area of likely flow separation 78 is known because of the existence of the high pressure gradient. The microjet is oriented approximately transversely to the direction of incoming flow 66, and just upstream of the area of likely flow separation. When the microjet is switched on, it creates rapidly moving air column 64. Because the flow within air column 64 is at a relatively high velocity, the column remains intact for a substantial distance away from the surface (though obviously it will become less organized and ultimately merge into the prevailing flow).

Incoming flow 62 must split and flow around air column 64 (designated as flow split 68 in the view). When the flow passes around the column it tends to curl back on itself and form a series of horseshoe vortices 72. Jet shear layer vortices 72 are formed around the column itself. As the column rises, it transitions into a counter-rotating vortex pair 76. Transient wake vortices 74 will also be formed between the bending air column and the boundary layer. These vortices will separate from the column and travel downstream with the prevailing flow.

The detached vortices travel with the prevailing flow and persist for a significant period of time. Although they are illustrated as being two dimensional, they in fact more typically involve complex three-dimensional flows. The detached vortices substantially increase the downstream mixing of the low momentum flow near the surface with the high momentum flow away from the surface, thus energizing the low momentum flow near the surface. This substantially increased mixing effect is on fact much more effective than the conventional method of parallel injection. The enhanced mixing causes the flow to remain attached to the bounding surface and can even reattach a detached flow at the time the microjet is turned on.

Figure 6C:
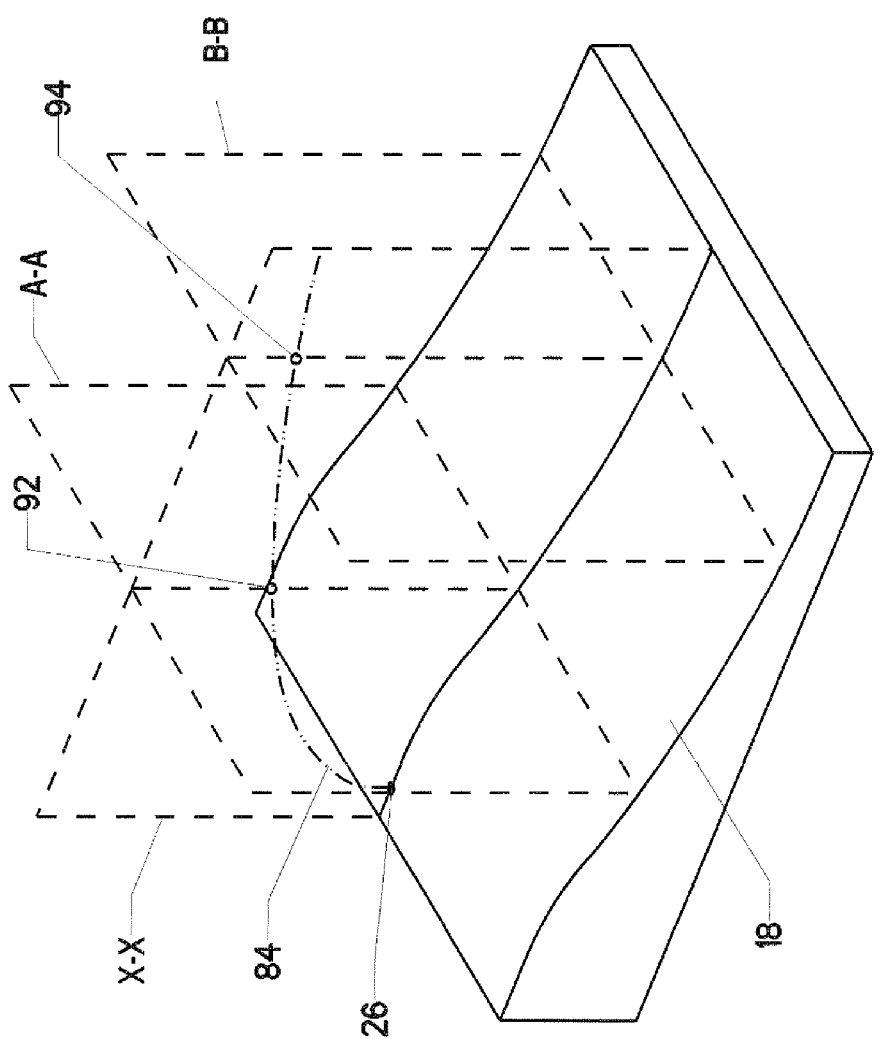
FIG. 6C is a perspective view, showing two analysis planes transverse to the path of the microjet.

FIG. 6C presents a frame of reference that will enhance the reader's understanding of the vortices created by the microjet. Microjet centerline 84 represents the center of the high speed air column introduced by the microjet. It bends as it encounters the prevailing flow. The microjet centerline lies in reference plane X-X (In reality the centerline will not tend to follow a purely planar path but the idealized planar depiction shown is sufficiently accurate for purposes of this explanation).

Reference plane A-A is created an arbitrary first distance downstream from the location of microjet 26. Reference plane B-B is created an arbitrary second distance downstream. First intersection point 92 represents the intersection of microjet centerline 84 with reference plane A-A. Second intersection point 94 represents the intersection of the microjet centerline with reference plane B-B.

The counter-rotating vortices develop along the path of microjet centerline 84. As stated previously, the actual flow around the vortices is a complex three-dimensional phenomenon. However, one may more easily visualize this phenomenon by taking two-dimensional "slices" of the flow at different points downstream of the microjet. Reference planes A-A and B-B are created for purposes of taking these two-dimensional "slices."

Figure 6D:
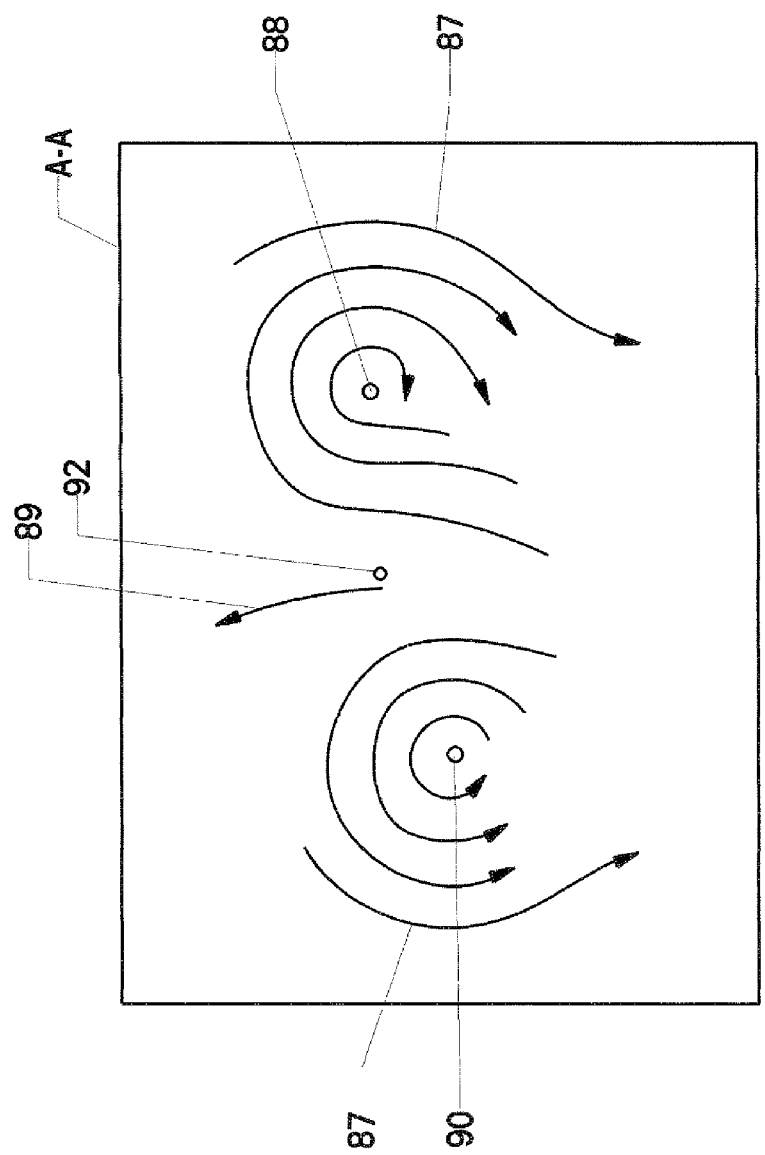
FIG. 6D is an elevation view, showing streamline flow in the first analysis plane.

FIG. 6D shows a two-dimensional "slice" taken through reference plane A-A. Streamlines are shown with arrows depicting the direction of flow for a particular streamline. First intersection point 92 represents the point where the microjet centerline passes through reference plane A-A.

Right vortex center 88 lies to the right of the first intersection point and left vortex center 90 lies to the left. The circulation around right vortex center 88 is clockwise while the circulation around left vortex center 90 is anticlockwise. The result of the dual circulation is that air flow between the two vortex centers tends to be moving rapidly upward (up flow 89) while air on the outside of the two vortex centers tends to be moving rapidly downward (down flow 87). Rotational flow such as shown can be very rapid.

Figure 6E:
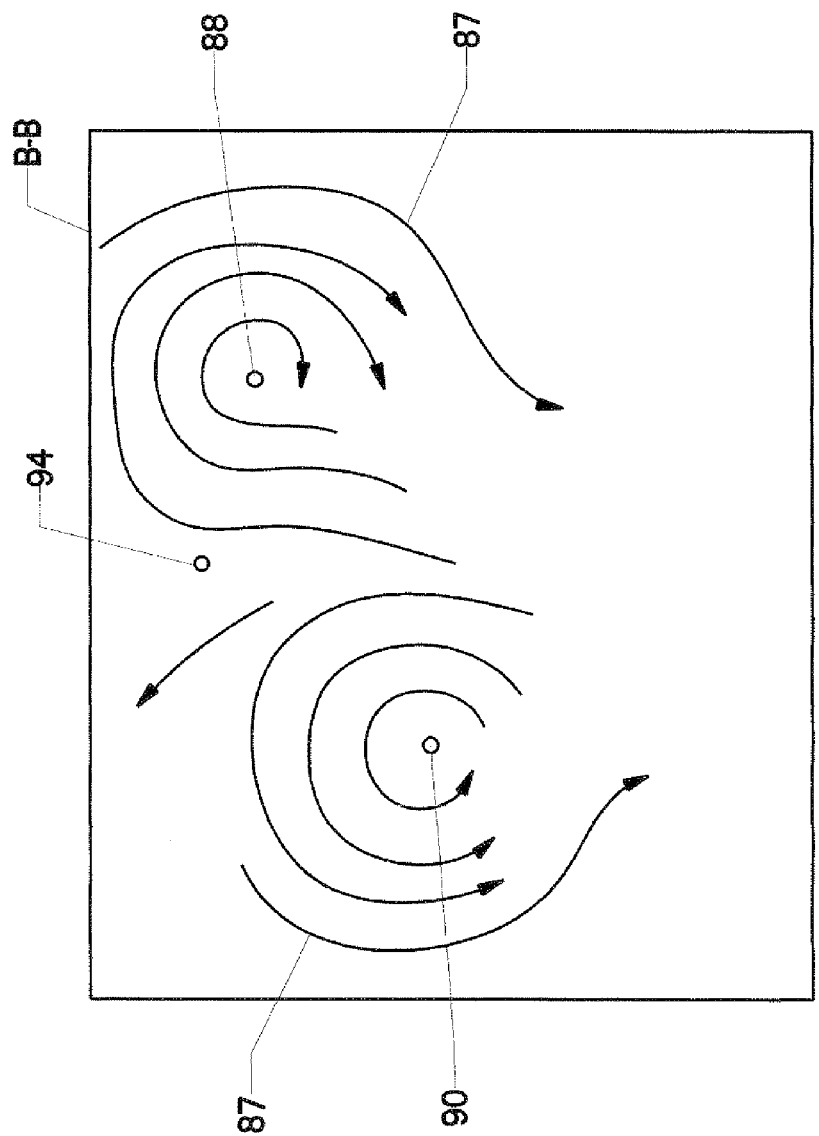
FIG. 6E is an elevation view, showing streamline flow in the second analysis plane.

FIG. 6E shows a two-dimensional "slice" taken through reference plane B-B. The same structures are present, though the reader will note that the size of the area of strong rotation has expanded somewhat. The two vortex centers 88, 90 are also lower with respect to the microjet centerline (second intersection point 94).

Figure 6F:
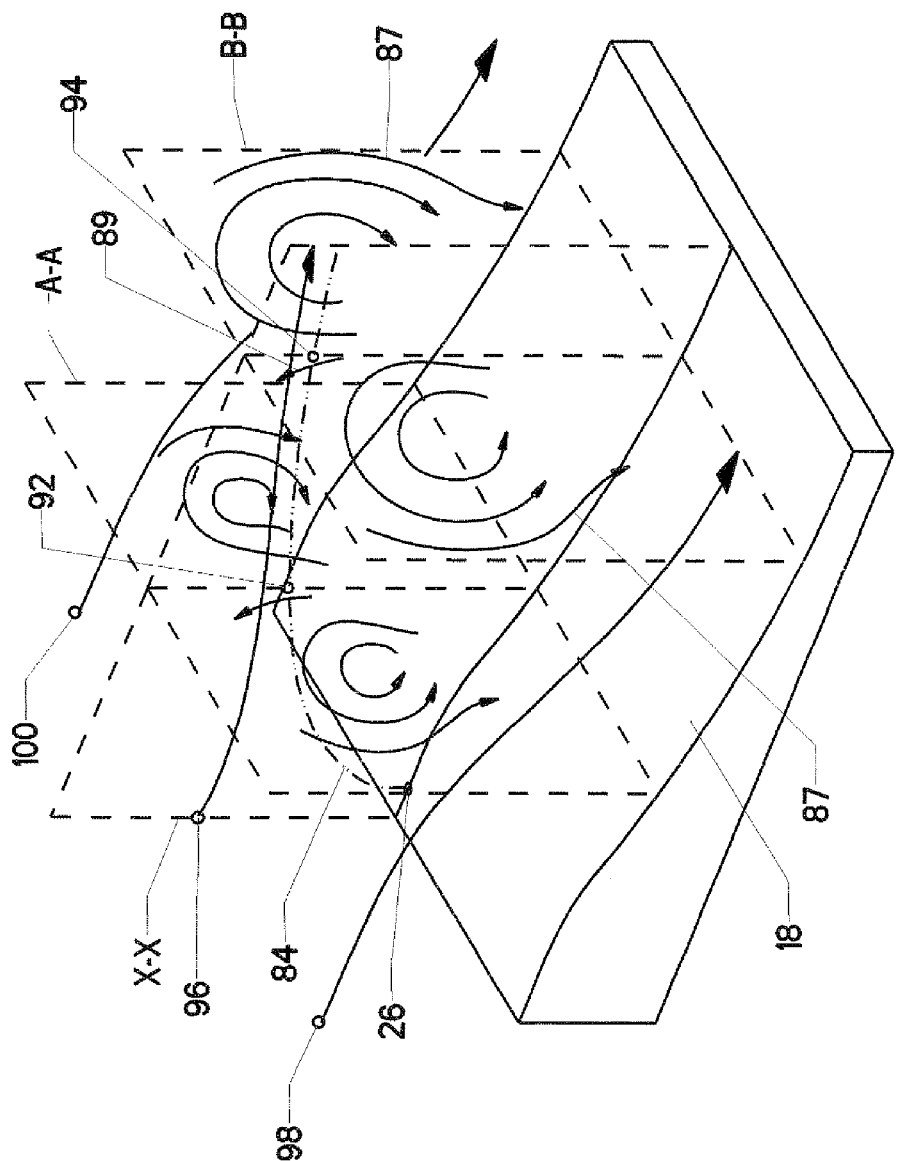
FIG. 6F is a perspective view, showing the effect of the counter-rotating vortex pair on the incoming flow.

After reviewing the two-dimensional "slices" it is possible to visualize the complex flow in three dimensions. FIG. 6F shows the same reference scheme as depicted in FIG. 6C. The two "slices" are shown in reference planes A-A and B-B. Three streams of incoming flow are also depicted: left flow 98, center flow 96, and right flow 100. These streams are moving at or near the freestream velocity of the prevailing flow. In other words, these streams represent flows having high momentum relative to the flow immediately adjacent to the surface.

Left flow 98 encounters the downward flowing air on the left side of the left vortex. It is thereby propelled downward toward the surface. Right flow 100 encounters the downward flowing air on the right side of the right vortex. It is also propelled downward toward the surface. Left flow 98 and right flow 100 therefore represent a transfer of momentum from the high-momentum region outside the boundary layer to the low-momentum region adjacent to the surface.

Center flow 96 encounters the upward flowing air between the two vortices and is actually forced upward. In most applications, more than one microjet will be present. As shown in some of the other drawing views, it is common to use a row or rows of microjets adjacent to (and generally upstream of) an area of suspected separation. If sufficient spacing is maintained between the microjets, more air will be forced downward than upward. Even if equal amounts of air are forced upward and downward, however, the violent mixing created by the rotational flow still creates a momentum transfer from the freestream into the boundary layer.

The mass injected by the microjet itself does not significantly energize the flow in the boundary layer. Rather, it is the fact that the flow of the microjet "pulls" high-momentum free stream flow down into the low-momentum boundary layer (via the creation of the counter-rotating vortices). This fact explains why the relatively small amount of flow through the properly placed microjets (0.2% of the total flow or less) can create such a dramatic effect and actually maintain attached flow (or reattach separated flow).

The inventive method contemplates (1) Defining the normal prevailing flow conditions over a bounding surface, so that a direction of flow can be anticipated for various conditions; (2) Defining an area of likely flow separation (such as by using computational or empirical techniques); (3) Placing one or more microjets adjacent to (and generally upstream of) the defined area of likely flow separation; (4) Selectively turning on the one or more microjets to create a gas column or gas columns that create counter-rotating vortices which are shed into the prevailing flow to enhance mixing between the prevailing flow and the boundary layer.

The method can be refined by adding pressure sensors or other sensors which can monitor for the presence of flow separation. This information can then be used to selectively turn on or off the appropriate microjets. Some or all of the microjets may also be throttled to increase or decrease the length of the gas column each produces. The control features can obviously be automated using software running on a computer.

The present inventive method does not require detailed temporal knowledge of the flow or an actuator that can be rapidly activated and deactivated. "Coarse" knowledge of the average flow is sufficient. For example, a series of pressure sensors can be placed along the upper surface of an airfoil. If these sense a rising pressure on the trailing edge of the upper surface, one may reasonably deduce that flow separation is imminent. An appropriate microjet array could then be switched on. One may also simply monitor for pressure fluctuation. The presence of pressure fluctuations beyond a defined threshold accurately predicts incipient separation.

The inventive method creates relatively large scale effects. It does more than simply reduce drag. It actually modifies the flow well beyond the traditional extent of the boundary layer. Increased velocity in the air column can be used to extend the creation of the vortices further away from the bounding surface. Increased flow is generally a function of the pressure feeding the microjet array.

Figure 7:
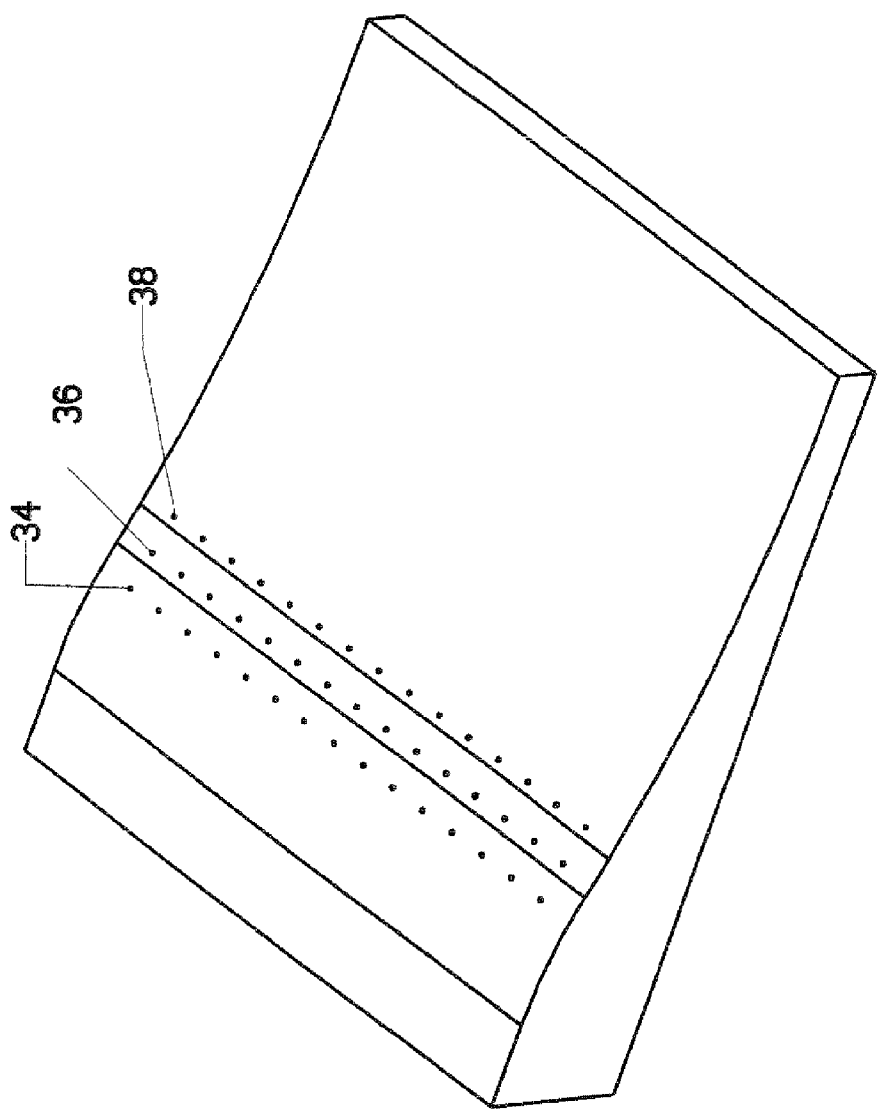
FIG. 7 is a perspective view, showing another embodiment of the present invention.

Control over a larger area (and with greater variation) is possible with a more complex array of microjets. FIG. 7 shows such an embodiment, employing three arrays of microjets. These are denoted as first jet array 34, second jet array 36, and third jet array 38. These arrays are preferably fed by individual manifolds so that they can be activated independently. The use of such a staggered array assists in flow control over a wider range of velocities.

Pressure and flow sensors can be added to sense the existence and location of separating flow. Computer control can be used to activate the appropriate microjet array to impede the separating flow. Of course, the flow phenomena may change rapidly. Thus, the control system should contemplate rapid activation and deactivation of the microjet arrays.

Figure 8:
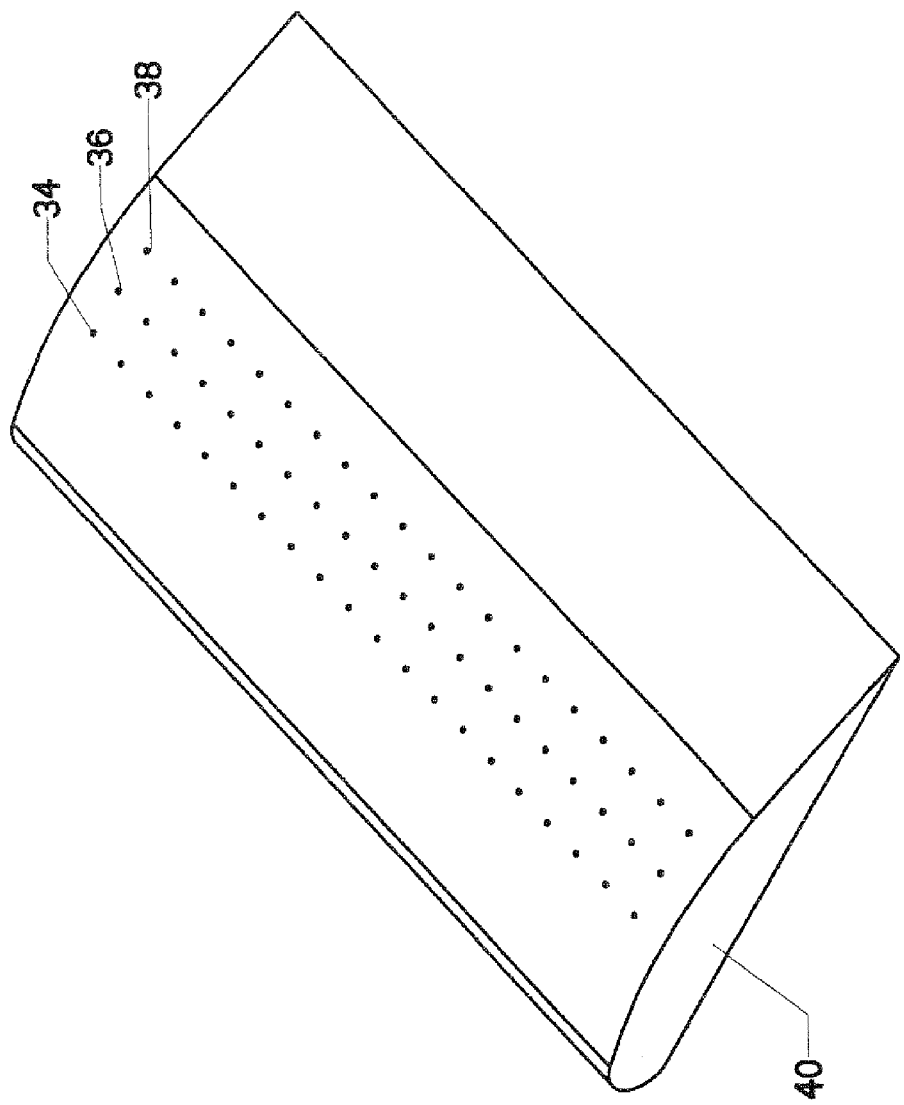
FIG. 8 is a perspective view, showing the application of the present invention to an airfoil.

The pressure gradient ramp has been illustrated in order to explain the general concepts of the invention. The microjets can be applied to many other aerodynamic surfaces, however. FIG. 8 shows airfoil 40. The profile shown is one commonly used for trailing edge flaps on aircraft wings. Flow separation can occur on such flaps along the upper trailing surface. Such flow separation degrades the flap's performance, thereby reducing the wing's overall lift. In severe circumstances such a flow separation can even cause the wing as a whole to stall.

The airfoil shown in FIG. 8 has been modified by the addition of three arrays of microjets. These can be activated to reduce or eliminate flow separation along the flap's trailing edge. To date, experiments indicate that a relatively low feed pressure can be used for the microjets. Pressures in the range of 20 to 50 psig can be effective (in some instances even lower). Those skilled in the art of aircraft systems will know that air flow bled from one of the stages of a jet engine's compressor can provide such pressures at sufficient flow rates. Thus, compressor bleed air can be used to provide the air necessary to drive the microjets.

The "plumbing" required to handle the pressurized air can also be relatively simple, since the pressures are low. Thus, although a trailing edge flap must move through an arc, a simple rotary union or flexible fitting can be used to supply pressurized bleed air to one or more manifolds inside the flap. Unlike hydraulic circuits, losses within such a system would not be critical. It is also significant to note that high-speed air control valves are widely available. This fact allows the microjets to be rapidly modulated if necessary.

In addition to providing increased airfoil performance, microjet arrays can also provide control forces. Those skilled in the art will know that aircraft are typically controlled in at least three degrees of freedom—roll, pitch, and yaw. Control forces are generally created by the activation of ailerons, elevators, and a rudder. The activation of such moving control surfaces creates sharp discontinuities in the aircraft's exterior surfaces, which can significantly increase the aircraft's radar signature.

Providing control moments without actually moving control surfaces is advantageous. Reaction control systems have provided such control forces for many years, with examples including the Hawker Harrier (AV-8 in the U.S. designation) and the Lockheed NF-104. Microjet arrays can provide such forces using the existing air flow over an aircraft.

Figure 9:
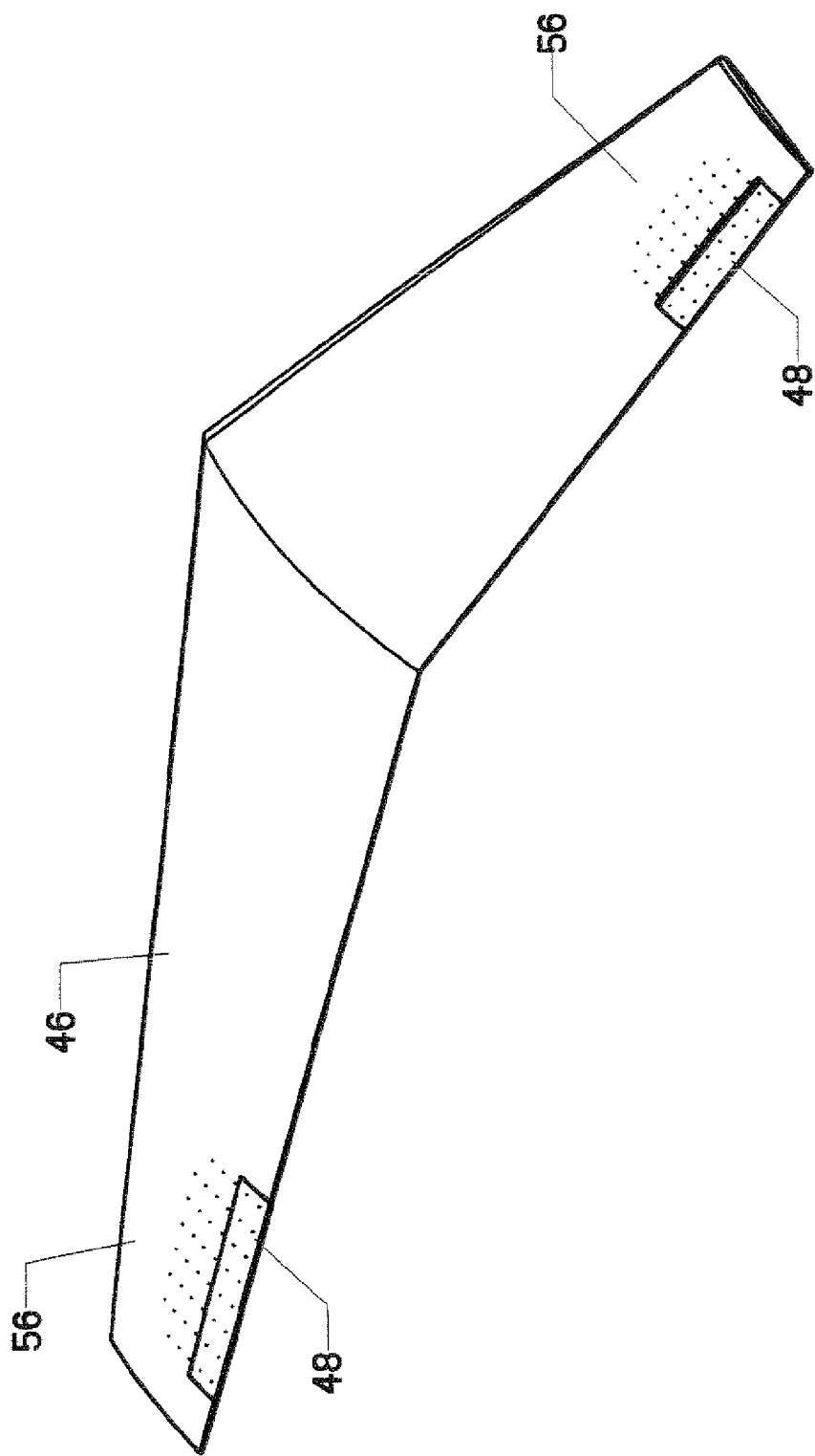
FIG. 9 is a perspective view, showing the application of two microjet clusters on a simplified symmetric wing.

FIG. 9 shows a simplified wing 46. It is a symmetric swept airfoil. This depiction is useful for illustrating the principles of microjet control, though it obviously omits many other features found on aircraft, such as other control surfaces, a fuselage, etc. Two conventional ailerons 48 are present. A microjet cluster 56 is located proximate each aileron.

Figure 10:
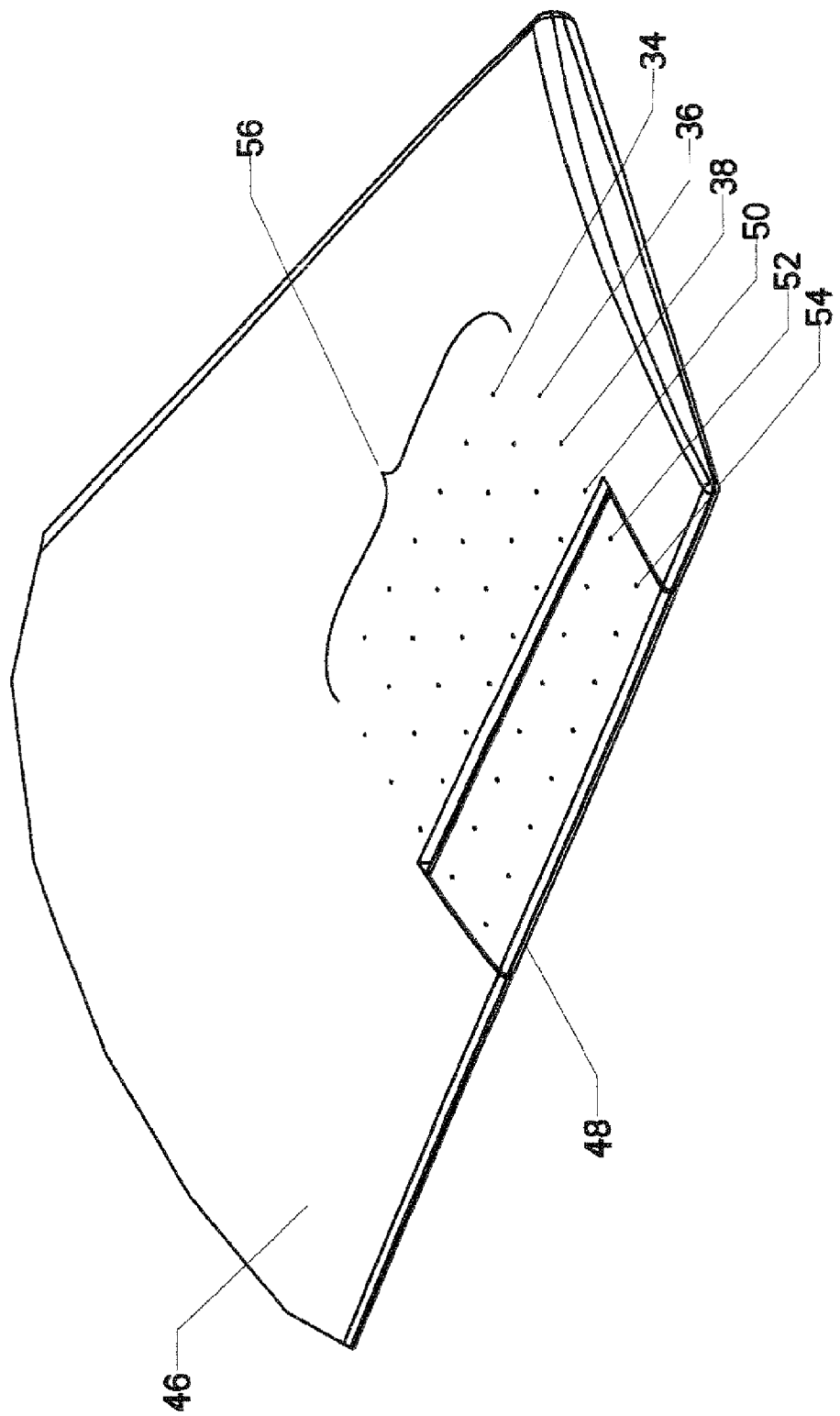
FIG. 10 is a partial perspective view showing one of the microjet clusters from FIG. 9.

FIG. 10 shows a closer view of one of the microjet clusters. The embodiment shown uses clusters which are grouped in linear arrays. Each linear array is approximately perpendicular to the direction of the flow. They are denoted as first jet array 34, second jet array 36, third jet array 38, fourth jet array 50, fifth jet array 52, and sixth jet array 54. The last two arrays are actually located on the movable aileron.

Figure 11:
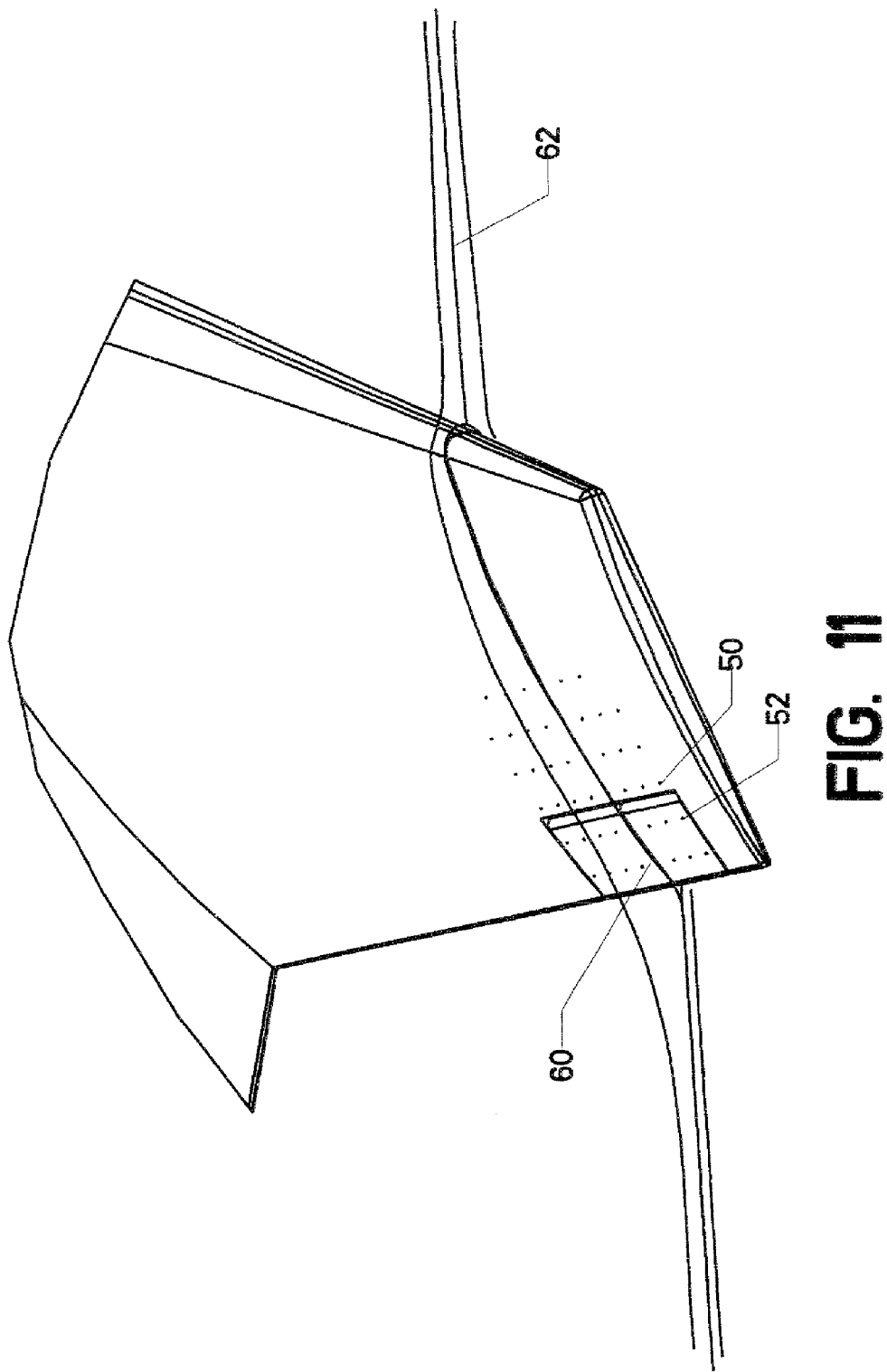
FIG. 11 is a partial perspective view, showing the use of appropriate microjets to preserve non-separated flow with a high angle of attack.

Conventional control of the aircraft is still possible using movable control surfaces. However, FIGS. 11-14 illustrate how microjet control is also possible. FIG. 11 shows airflow over the wing when the wing is placed at a fairly high angle of attack. Those skilled in the art will be familiar with the depiction of airflow as streamlines. Incoming flow 62 splits and flows around the wing. Appropriate microjet arrays have been activated in order to prevent flow separation (in a fashion similar to the depiction in FIG. 6). Fourth jet array 50 and fifth jet array 52 have been activated in this case. The result is unseparated flow 60.

Figure 12:
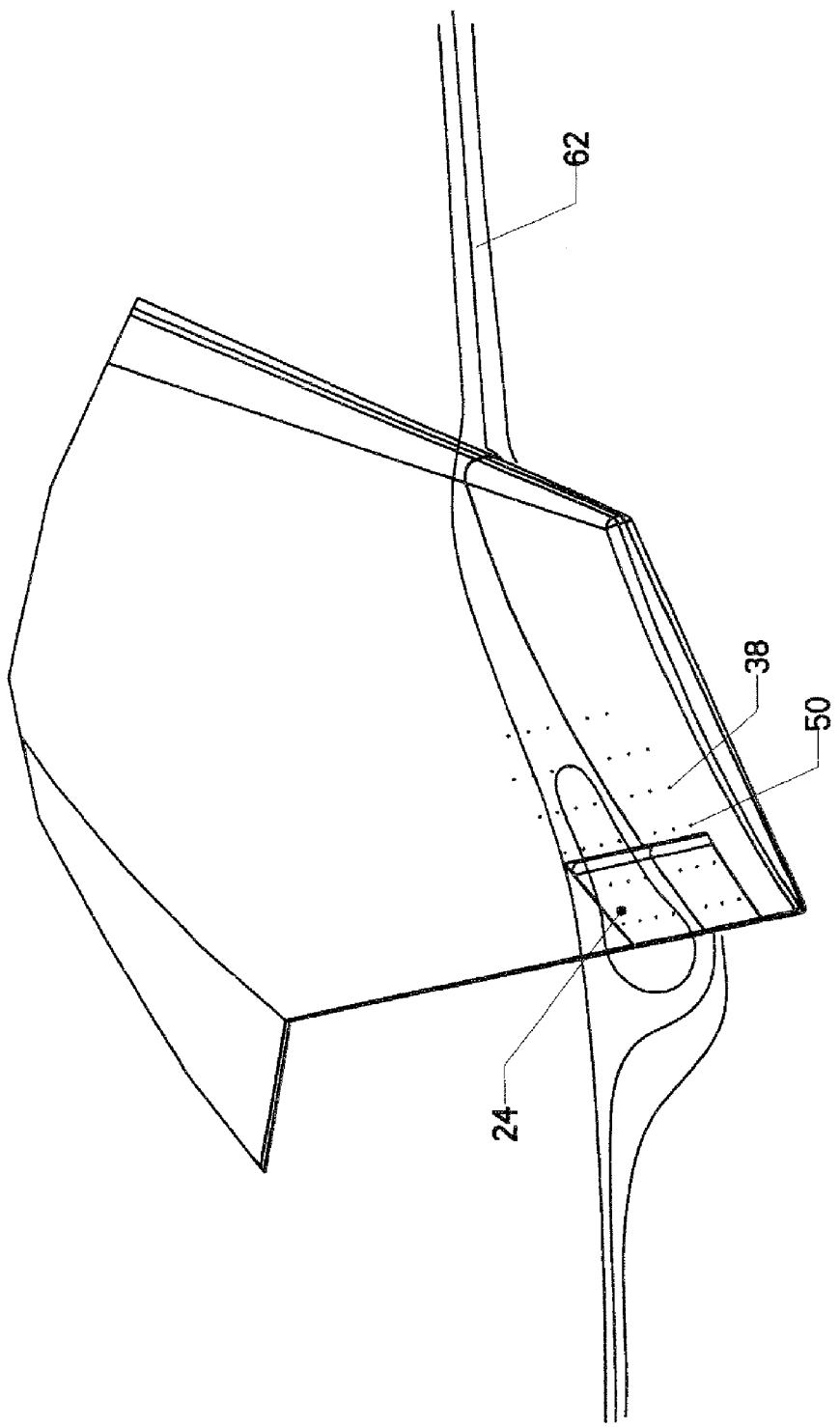
FIG. 12 is a partial perspective view, showing flow separation when no microjets are active.

If the microjets are turned off in this scenario flow separation will occur. FIG. 12 shows this state. Separated flow zone 24 has arisen. The wing has not actually stalled, but a significant portion of its surface area has been effectively lost. The lift produced by the wing is therefore reduced.

Figure 14:
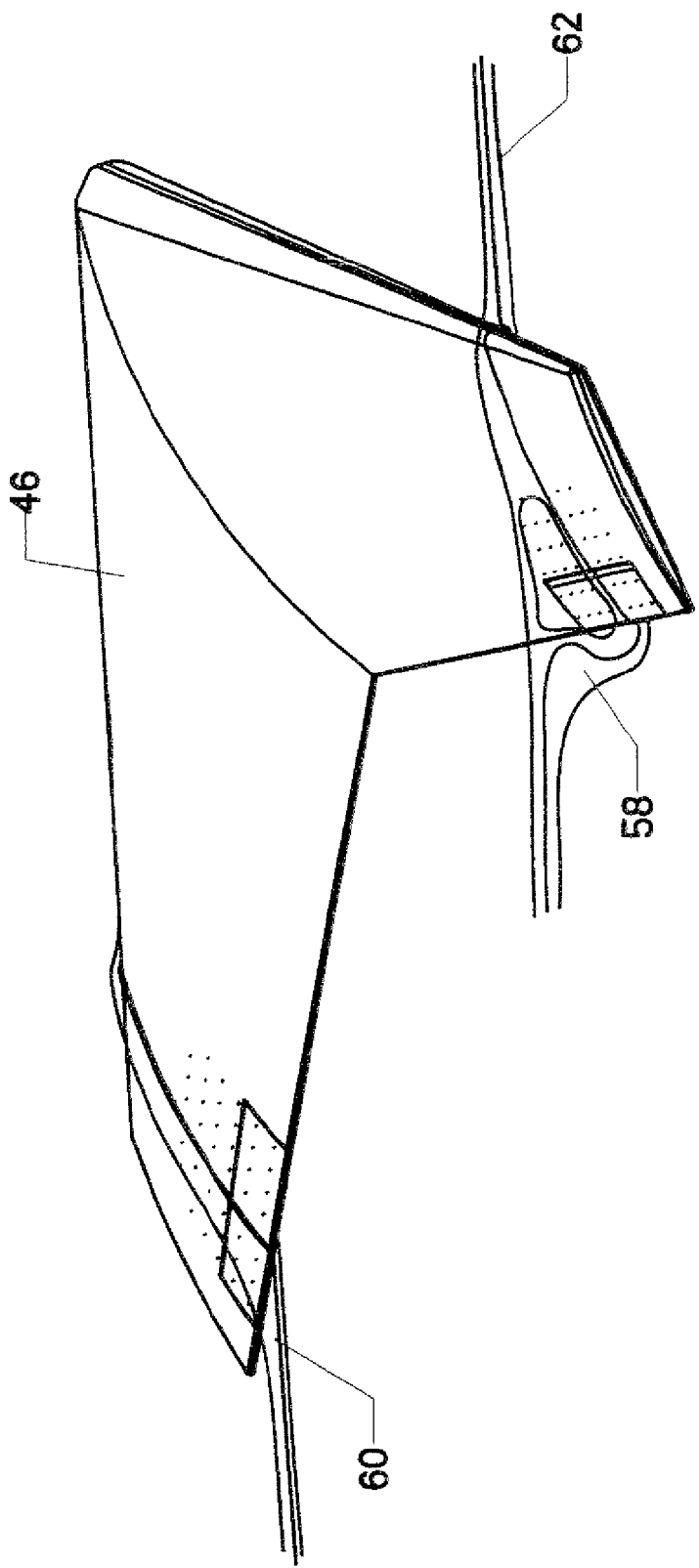
FIG. 14 is a perspective view, showing the use of microjets to create differential flow separation and a rolling moment.
Figure 15:
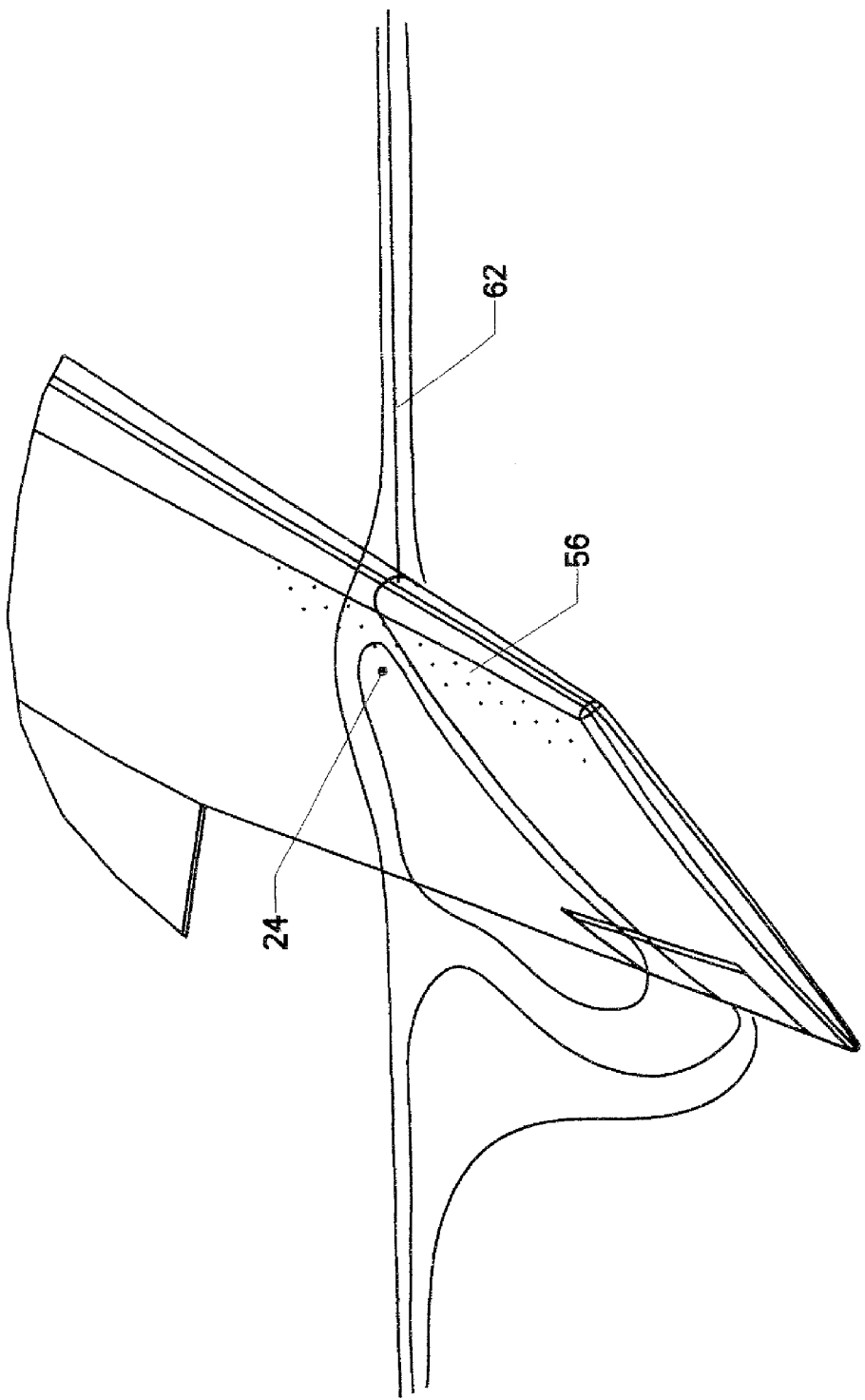
FIG. 15 is a partial perspective view, showing the placement of a microjet array near an airfoil's leading edge.

The array shown in FIGS. 11 and 14 is positioned on the trailing half of the wing's cross section. In many instances, however, it will be advantageous to place the array near the wing's leading edge. FIG. 15 shows the same wing proceeding through the air at an even higher angle of attack. Separated flow zone 24 commences near the wing's leading edge. Microjet cluster 56 is accordingly placed very close to the leading edge, in order to inject flow at the point where it will be most effective in reducing or eliminating the separated flow zone. In fact, in some instances, it may be advantageous to place microjets over a large expanse from the leading edge to the trailing edge.

Figure 13:
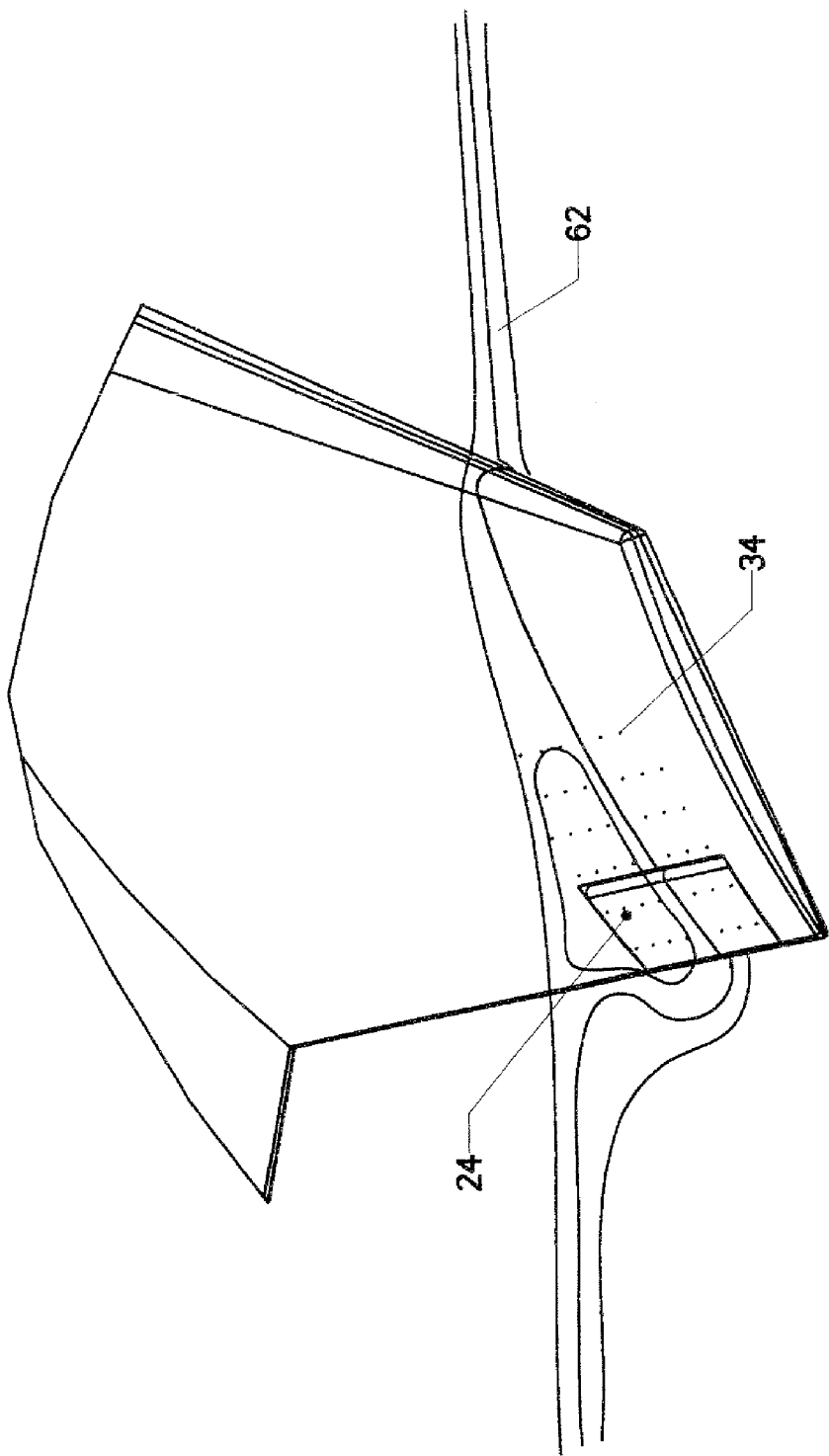
FIG. 13 is a partial perspective view, showing more severe flow separation caused by activating appropriate microjets.

Microjet arrays can also be used to induce flow separation. FIG. 13 shows this phenomenon. First jet array 34 lies within the attached region of flow. If it is activated, it can actually force the boundary layer away from the wing surface and bring the leading portion of separated flow zone 24 forward. By comparing FIG. 13 to FIG. 12, the reader will observe how activating a microjet array in the appropriate location can increase flow separation and further reduce the lift produced by the wing.

Now that the reader understands these flow control techniques, their application in creating aircraft control forces can be appreciated. FIG. 14 shows wing 46 in its entirety. The far microjet cluster is operated to prevent flow separation, whereas the near microjet cluster is operated to actually promote flow separation. Unseparated flow 60 exists over the far cluster whereas separated flow 58 exists over the near cluster. The far portion of the wing generates more lift in this state, thereby creating a rolling moment (or rolling torque) tending to put the aircraft into a right bank.

Setting the microjet arrays for the opposite states will create a roll into a left bank. Additional microjet arrays can be positioned to create pitch and yaw moments (or torques). Thus, it is possible to create controlling forces without the need to deflect any movable control surfaces. Having thus described the general operation and potential application of the microjets, a more detailed explanation of their operation will facilitate the reader's understanding. The microjet shown in FIG. 6 comprises a simple cylindrical tube.

Experimentation suggests that the ratio of the microjet momentum to the freestream momentum may be an important parameter. An expression can be developed to quantify the effect of mass and momentum flux input. The mass flux coefficient, M*, and the steady momentum coefficient are defined in the following:

$$M^* = (\text{Mass Input})/(\text{Mass deficit based on } \delta),$$

where $\delta$ is the boundary layer thickness at the leading portion of the ramp. The mass input, m* produced by the microjets is estimated by assuming choked flow through micro-nozzles. The resulting (non-general) expression for the mass flux coefficient is then:

$$M^* = \frac{m^*}{\rho_\infty U_\infty z \delta},$$

where $\rho_\infty$ is the freestream density, $U_\infty$ is the freestream velocity, and z is the width of the model. The conventional definition of the steady momentum coefficient is used, and is given as:

$$C_\mu = \frac{NM^* U_j}{0.5 * U_\infty}$$

where N is the number of microjets and $U_j$ is the jet velocity.

The steady momentum coefficient is proportional to the square of the mass flux coefficient, meaning that small changes in the mass flux coefficient produce larger changes in the steady momentum coefficient. Higher steady momentum coefficients produce higher velocities near the ramp surface, indicating higher momentum near the wall (and consequently less likelihood of flow separation).

The reason behind this higher momentum is that with an increase in the steady momentum coefficient, (1) Momentum is directly injected into the boundary layer, (2) Strong streamwise vortices are generated which tend to mix the higher velocity air further away from the ramp surface into the boundary layer, and (3) The microjet momentum and resulting penetration depth increases, increasing the transfer of momentum from the mainstream fluid to the boundary layer.

These explanations pertain to the use of microjets with steady flow. However, pulse microjet injection may reduce the flow mass requirements while giving comparable performance. In some circumstances, the use of a pulsed microjet may even give enhanced performance. Pulsed microjet activation can:

1. Provide the same control effect with less mass flow. In some cases, the mass flow can be reduced to as low as 40% of the steady injection mass flow rate;
2. Provide better control, such as providing better noise reduction for impinging jets;
3. Extend the operating regime of systems by reducing unwanted effects (such as excessive noise or unwanted flow separation) in areas where steady control was not as effective; and
4. Reducing overall bleed flow needed to support a complex array of microjets.

The use of sensors to detect the flow state has been mentioned previously. Although the exact placement of sensors will depend on the application, they should generally be located so as to provide the maximum information regarding the state of the system. As a simple example, an unsteady pressure transducer can be located along a boundary where flow separation is likely to occur.

The information provided by the sensors will be processed through a controller and used to determine the appropriate microjet operating parameters. The controller would then activate the appropriate microjets to produce the desired effect. In the event of a pulsed microjet, the controller will also need to determine pulsing frequency, amplitude, and duty cycle.

Those skilled in the art will know that many types of sensors could provide useful information to such a system. These include hot-film, hot wire, strain gages, mechanical flutter gages, and temperature sensors.

Accordingly, the reader will appreciate how the use of microjets can reduce or eliminate flow separation in the region of a negative pressure gradient, and also how the use of microjets can actually promote flow separation where desired. Although the preceding description contains significant detail, it should not be construed as limiting the scope of the invention but rather as providing illustrations of the preferred embodiments of the invention. As an example, although a simple cylindrical flow passage was described for the microjet, much more complex shapes could be used. A straight portion designed to bring the Mach number up to unity could be connected to a DeLaval-type expansion nozzle. Such an arrangement would produce strongly supersonic injection velocities. Such a change would not alter the basic operative concepts of the invention.

The reader should also bear in mind that although the illustrations have focused on compressible flow (through air), the invention also has application to incompressible fluids. Flow separation occurs in hydrodynamic control surfaces such as those found on submarines. Microjet arrays can be used to control these phenomena as well. Thus, the invention should be understood in a broad sense, as set forth in the following claims.

The invention claimed is:

1. In a surface placed in a moving stream of gas, a method of controlling flow separation in a boundary layer near said surface, comprising:
    a. defining an area of likely flow separation;
    b. providing at least one microjet, positioned on said surface proximate said defined area of likely flow separation, said microjet having a diameter in the range of 100 micrometers to 2,000 micrometers;
    c. wherein said microjet is oriented approximately perpendicularly to the direction of flow of said moving gas stream;
    d. providing a pressurized gas supply connected to said at least one microjet so that said microjet injects a stream of high-velocity pressurized gas into said moving gas stream in a direction which is approximately perpendicularly to said direction of flow;
    e. said pressurized gas supply having a pressure that is between 14 kPa and 345 kPa greater than a pressure of said moving stream of gas;
    f. said stream of high-velocity pressurized gas having a velocity that is between Mach 0.4 and Mach 1.0;
    g. whereby said injected stream of high-velocity pressurized gas creates a pair of counter-rotating vortices in said moving stream of gas, said counter-rotating vortices pulling a portion of said moving stream of gas toward said surface, thereby transferring momentum from said moving stream of gas to said boundary layer.

2. A method of controlling flow separation as recited in claim 1, wherein said pressurized gas supply comprises gas compressed by an aircraft engine.

3. A method of controlling flow separation as recited in claim 1, further comprising:
    a. providing a control device for selectively connecting said pressurized gas supply to said at least one microjet;
    b. providing a flow separation sensor, positioned to sense flow separation within said area of likely flow separation; and
    c. activating said control device in order to connect said pressurized gas supply to said at least one microjet when said flow separation sensor senses said flow separation.

4. A method of controlling flow separation as recited in claim 3, wherein said control device is capable of rapidly altering said connection between said pressurized fluid supply and said at least one microjet so that said at least one microjet injects a pulsed stream of pressurized gas into said moving gas stream.

5. In a surface having a leading portion, a trailing portion, and an adverse pressure gradient therebetween, wherein said surface is placed in a moving gas stream, a method of controlling flow separation in a boundary layer proximate said surface, comprising:
    a. providing a first microjet, positioned on said surface proximate said adverse pressure gradient but between said adverse pressure gradient and said leading portion;
    b. wherein said first microjet is oriented approximately perpendicularly to the direction of flow of said moving gas stream;
    c. providing a second microjet, positioned on said surface proximate said adverse pressure gradient and between said first microjet and said trailing portion;
    d. wherein said second microjet is oriented approximately perpendicularly to the direction of flow of said moving gas stream;
    e. said first and second microjets having a diameter in the range of 100 micrometers to 2,000 micrometers;
    f. providing a pressurized gas supply connected to said first microjet so that said first microjet injects a first stream of high-velocity pressurized gas into said moving gas stream in a direction which is approximately perpendicularly to said direction of flow;
    g. providing a pressurized gas supply connected to said second microjet so that said second microjet injects a second stream of high-velocity pressurized gas into said moving gas stream in a direction which is approximately perpendicularly to said direction of flow;
    h. said pressurized gas supply having a pressure that is between 14 kPa and 345 kPa greater than a pressure of said moving stream of gas;
    i. said streams of high-velocity pressurized gas having a velocity that is between Mach 0.4 and Mach 1.0;

j. whereby said injected streams of high-velocity pressurized gas each create a pair of counter-rotating vortices in said moving stream of gas, said counter-rotating vortices pulling a portion of said moving stream of gas toward said surface, thereby transferring momentum from said moving stream of gas to said boundary layer.

6. A method of controlling flow separation as recited in claim 5, wherein said controller is capable of rapidly altering said connection between said pressurized fluid supply and said first and second microjets so that said microjets inject a pulsed stream of pressurized gas into said moving gas stream proximate said adverse pressure gradient.

7. A method of controlling flow separation as recited in claim 5, further comprising:
  a. providing a controller for selectively connecting said pressurized fluid supply to said first microjet and independently to said second microjet; and
  b. providing a flow separation sensor, positioned to sense flow separation proximate said adverse pressure gradient, wherein said flow separation sensor is in communication with said controller so that when said flow separation sensor senses said flow separation, said controller connects said pressurized fluid supply to said first microjet, said second microjet, or said first and second microjet.

8. A method of controlling flow separation as recited in claim 7, wherein said controller is capable of rapidly altering said connection between said pressurized fluid supply and said first and second microjets so that said microjets inject a pulsed stream of pressurized gas into said moving gas stream proximate said adverse pressure gradient.

9. A method of controlling flow separation as recited in claim 7, wherein said pressurized gas supply comprises gas compressed by an aircraft engine.

10. A method of controlling flow separation as recited in claim 9, wherein said controller is capable of rapidly altering said connection between said pressurized fluid supply and said first and second microjets so that said microjets inject a pulsed stream of pressurized gas into said moving gas stream proximate said adverse pressure gradient.

11. A method of controlling flow separation as recited in claim 5, wherein said pressurized gas supply comprises gas compressed by an aircraft engine.

12. A method of controlling flow separation as recited in claim 11, wherein said controller is capable of rapidly altering said connection between said pressurized fluid supply and said first and second microjets so that said microjets inject a pulsed stream of pressurized gas into said moving gas stream proximate said adverse pressure gradient.

13. A method of creating a control force for controlling an aircraft, wherein said aircraft is placed in a moving air stream, comprising:
  a. providing at least one surface on said aircraft having an adverse pressure gradient, with said at least one surface being positioned on said aircraft such that the prevention of flow separation proximate said adverse pressure gradient will create asymmetric flow over said aircraft and an induced control force, said at least one surface having a boundary layer;
  b. providing at least one microjet, positioned on said at least one surface proximate said adverse pressure gradient;
  c. wherein said at least one microjet is oriented approximately perpendicularly to the direction of flow of said moving air stream over said at least one surface;
  d. said at least one microjet having a diameter in the range of 100 micrometers to 2,000 micrometers;
  e. providing a pressurized gas supply connected to said at least one microjet so that said microjet injects a stream of high-velocity pressurized gas into said moving gas stream in a direction which is approximately perpendicular to said direction of flow;
  f. said pressurized gas supply having a pressure that is between 14 kPa and 345 kPa greater than a pressure of said moving air stream;
  g. said stream of high-velocity pressurized gas having a velocity that is between Mach 0.4 and Mach 1.0; and
  h. whereby said injected stream of high-velocity pressurized gas creates a pair of counter-rotating vortices in said moving stream of air, said counter-rotating vortices pulling a portion of said moving stream of air toward said surface, thereby transferring momentum from said moving stream of gas to said boundary layer.

14. A method of creating a control force for controlling an aircraft as recited in claim 13, further comprising providing a flow separation sensor, positioned to sense flow separation proximate said adverse pressure gradient.

15. A method of creating a control force for controlling an aircraft as recited in claim 14, wherein said pressurized gas supply comprises gas compressed by an aircraft engine.

* * * * *